United States Patent [19]

Taber

[11] Patent Number: 5,115,847

[45] Date of Patent: May 26, 1992

[54] ADJUSTABLE SUPPORT APPARATUS FOR TABLE SAWS

[76] Inventor: Tarrell L. Taber, 2609 Denver St., Kansas City, Mo. 64141

[21] Appl. No.: 687,670

[22] Filed: Apr. 19, 1991

[51] Int. Cl.$^5$ ............................................... B27H 1/02
[52] U.S. Cl. ..................... 144/287; 83/453; 83/466.1; 108/69; 108/90; 108/97; 144/286 A; 269/296
[58] Field of Search ............. 144/1 R, 286 R, 286 A, 144/287; 269/240, 293, 303; 83/452, 453, 466.1; 108/64, 65, 69, 90, 97, 152

[56] References Cited

U.S. PATENT DOCUMENTS

| | | |
|---|---|---|
| 3,695,189 | 10/1972 | Felder, Jr. ............................ 108/69 |
| 4,259,887 | 4/1981 | Dean . |
| 4,677,920 | 7/1987 | Eccardt . |
| 4,726,405 | 2/1988 | Bassett . |
| 4,757,849 | 7/1988 | Morris ................................ 144/287 |
| 4,798,113 | 1/1989 | Viazanko . |
| 4,860,807 | 8/1989 | Vacchiano .................... 144/286 A |
| 4,964,450 | 10/1990 | Hughes et al. ................. 144/286 A |

Primary Examiner—W. Donald Bray
Attorney, Agent, or Firm—Henderon & Sturm

[57] ABSTRACT

An adjustable support apparatus (10) for use with table saws (100) to support and secure diversely configured workpieces (200) thereon, between a pair of adjustable clamp units (13) which are selectively disposed on at least one pair of extension arm units (12) operatively connected to the table saw (100).

5 Claims, 5 Drawing Sheets

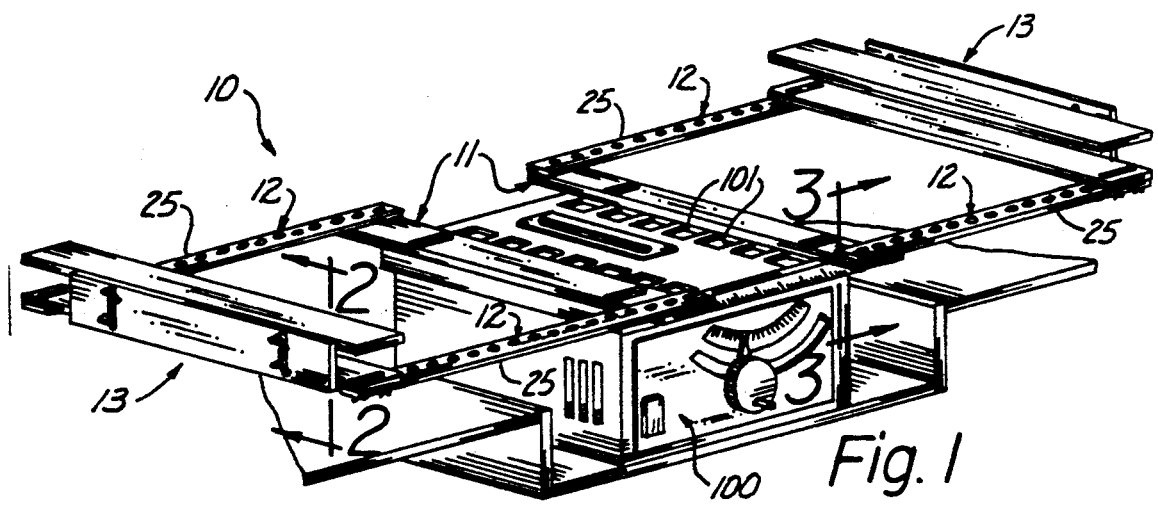
Fig. 1
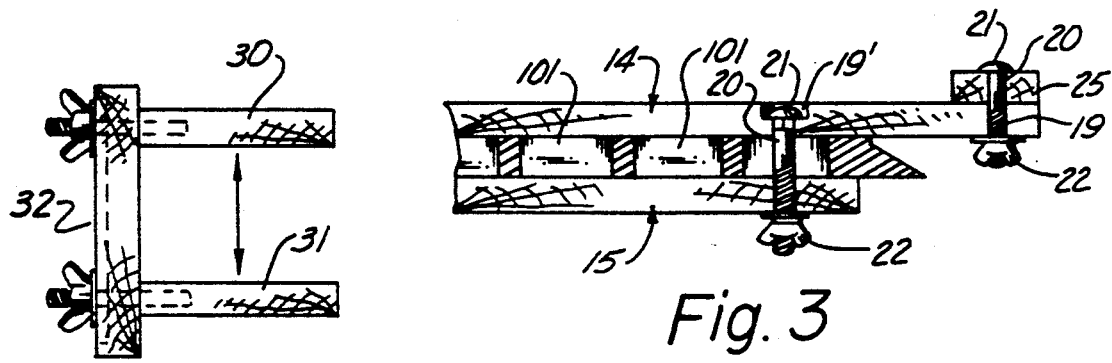
Fig. 2
Fig. 3
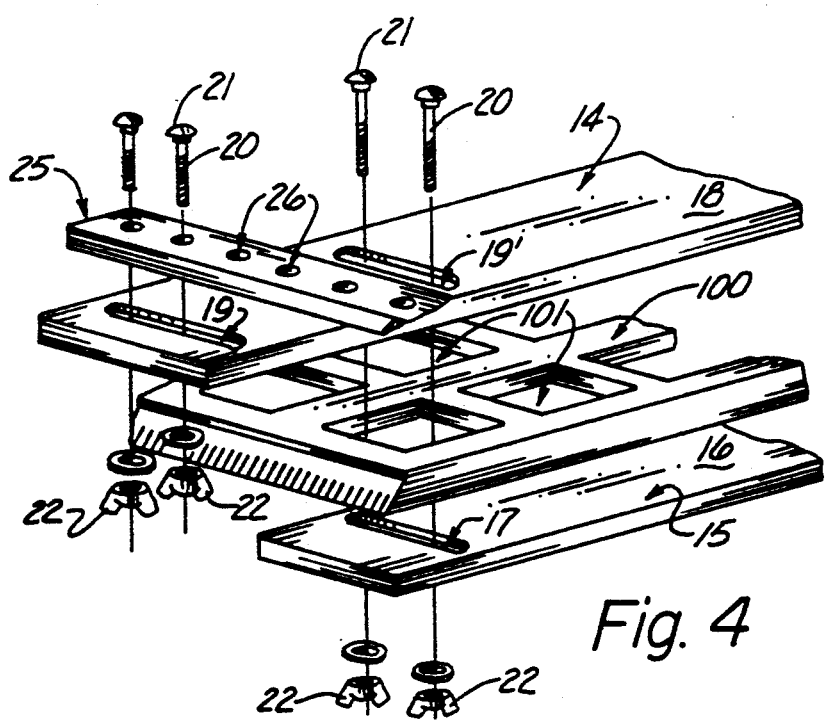
Fig. 4

1

ADJUSTABLE SUPPORT APPARATUS FOR TABLE SAWS

BACKGROUND ART

As can be seen by reference to the following U.S. Pat. Nos. 4,726,405; 4,798,113; 4,677,920; and 4,259,887; the prior art is replete with myriad and diverse extension apparatus for table saws.

While all of the aforementioned prior art constructions are more than adequate for the basic purpose and function for which they have been specifically designed, these devices are uniformly deficient with regard to their scope of adjustability as well as their limited usage from a functional standpoint particularly with regard to odd shaped articles such as chairs and the like, which require that the end members be disposed at an angular orientation relative to one another.

As a consequence of the foregoing situation, there has existed a longstanding need among craftsman for a versatile and variably adjustable work platform that is adapted to be secured to a table saw to clamp and/or captively secure diverse workpieces; and, the provision of such a construction is a stated objective of the present invention.

DISCLOSURE OF THE INVENTION

Briefly stated, the adjustable support apparatus for table saws which forms the basis of the present invention comprises two pairs of extension arm units a pair of base units and a pair of clamp units; wherein, the pairs of extension arm units are operatively attached on opposite ends of a table saw via the base units; and, the clamp units are moveably disposed at selected locations on the respective pairs of extension arm units.

Furthermore the clamp units are provided with vertically adjustable jaw members; and, the lateral angular orientation of the jaw members attached to a pair of vertical brace members or the vertical brace members by themselves may be varied to accommodate odd shaped work pieces as will be explained further on in the specification.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the apparatus attached to a table saw;

FIG. 2 is a detail view of one of the clamp units taken through line 2—2 of FIG. 1;

FIG. 3 is a detail view of the operative connection between the base unit and an extension arm unit taken through line 3—3 of FIG. 1;

FIG. 4 is an exploded perspective view of the arrangement depicted in FIG. 3;

BEST MODE FOR CARRYING OUT THE INVENTION

Figure 5:
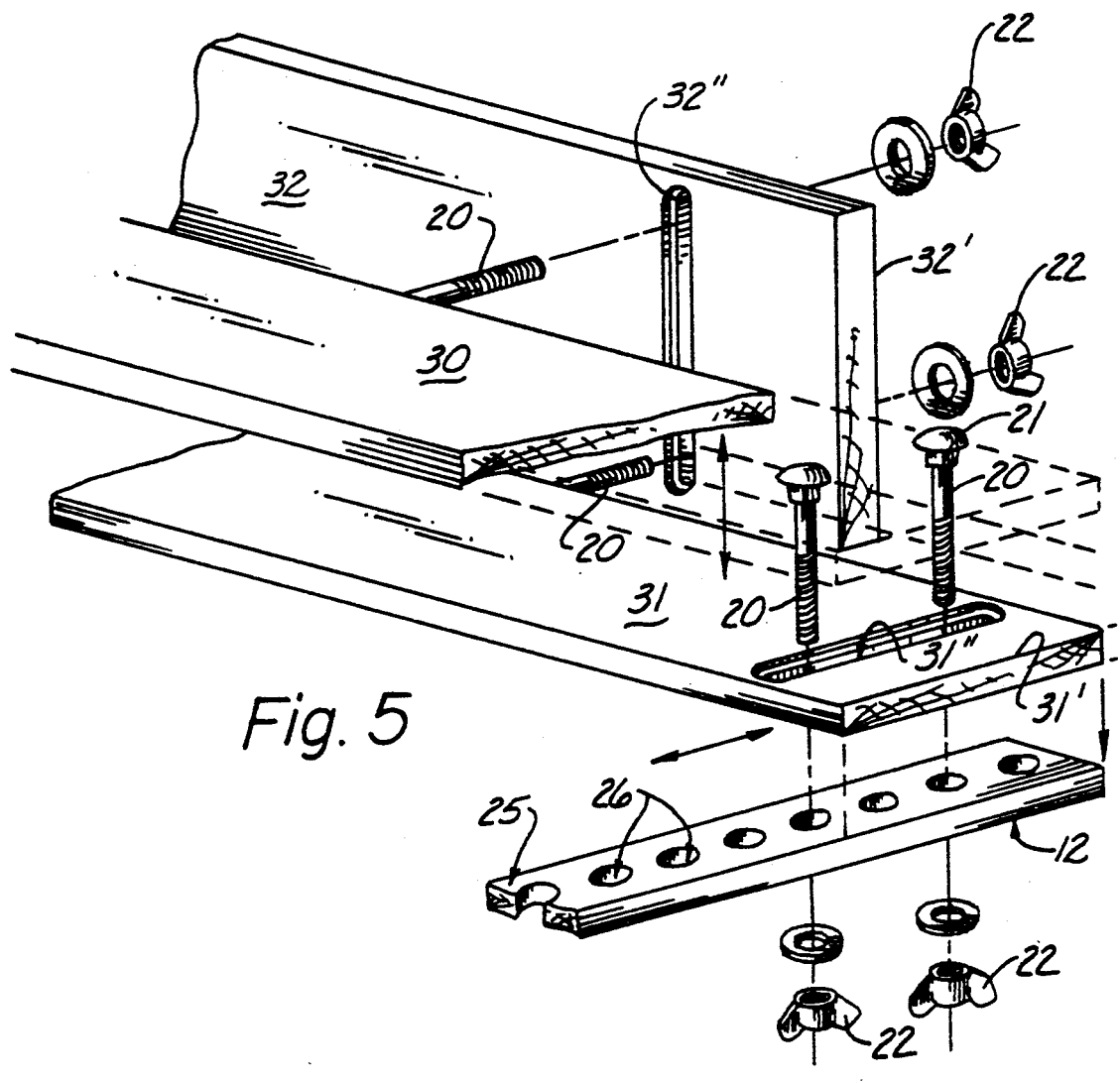
FIG. 5 is an exploded perspective view of the engagement between one of the clamp units and an extension arm unit.

As can be seen by reference to the drawings, and in particular to FIG. 1, the adjustable support apparatus that forms the basis of the present invention is designated generally by the reference number (10). The apparatus (10) comprises in general a pair of mounting base units (11); at least one pair of extension arm units (12) and a pair of clamp units (13). These units will now be described in seriatim fashion.

As can best be seen by reference to FIGS. 1, 3 and 4 the mounting base units (11) are adapted to releasably secure the apparatus (10) to a table saw (100) via the apertures (101) that are provided on opposite ends of a table saw (100).

As can be seen particularly be reference to FIG. 4, each of the mounting base units (11) comprises an upper (14) and a lower (15) mounting base member; wherein, the lower (15) mounting base member includes a generally rectangular base board (16) having an elongated slot (17) formed proximate to, but spaced from, each end; and, wherein the upper (14) mounting base member includes a generally elongated rectangular base board (18) having a pair of slots (19) (19') formed proximate to, but spaced from each end.

In addition the slots (19) (19') are disposed parallel to one another; wherein, the longitudinal axis of the stepped shoulder inboard slot (19') is aligned with the single slot (17) in the lower mounting base member (15); whereby an elongated threaded fastening member (20) having an enlarged head (21) may extend through the slot (19') an aperture (101) in the table saw (100), and the slot (17) in the lower mounting base member (15) to receive threaded fasteners (22) for securing the mounting base units (11) to the table saw (100) in a well recognized fashion.

In the first version of the preferred embodiment illustrated in FIGS. 1 through 5, the apparatus (10) employs two pairs of extension arm units (12) wherein each pair of extension arm units (12) project outwardly from the mounting base units (11) disposed on the opposite ends of the table saw (100).

In addition each of the extension arm units (12) comprise a relatively slim elongated generally rigid extension arm member (25) having a plurality of equally spaced relatively discrete apertures (26) disposed along its longitudinal axis; wherein, the apertures (26) are dimensioned to receive threaded fastening members (20) which extend through the outer slots (19) in the upper mounting base member (14) to secure the extension arm units (12) to the mounting base units (11) in a well recognized fashion.

In this particular version of the preferred embodiment depicted in FIG. 2, the pair of clamp units (13)

each comprise an upper (30) and a lower (31) horizontally disposed jaw member which are operatively connected to one another by a vertical brace member 32.

As can best be seen by reference to FIGS. 2 and 5, the outboard ends (31') and (32') of the lower jaw member (31) and the vertical brace member (32) are provided with elongated slots (31") and (32") respectively, whose purpose and function will be described presently. In addition aligned elongated fastening members (20) project outwardly from the sides of the upper (30) and lower (31) jaw members; wherein the fastening members (20) are dimensioned to be received in the slot (32") to adjustably secure the jaw members (30) (31) to the brace member (32) in a well recognized fashion; wherein, the position of the upper jaw member (30) may be varied relative to the lower jaw member (31).

Furthermore as shown in FIG. 5, additional fastening members (20) are provided which extend through the slot (31") in the lower jaw member and through selected apertures (26) in the extension arm members (25) to operatively connect the clamp units (13) at a selected location on the extension arm units (12).

By now it should be appreciated that the spacing of the jaw members (30)(31) of the clamp units (13) may be varied to accept workpieces having different thicknesses; and, the distance between the clamp units (13) on the extension arm units (12) may likewise be varied to accommodate workpieces having different lengths or widths.

Figure 6:
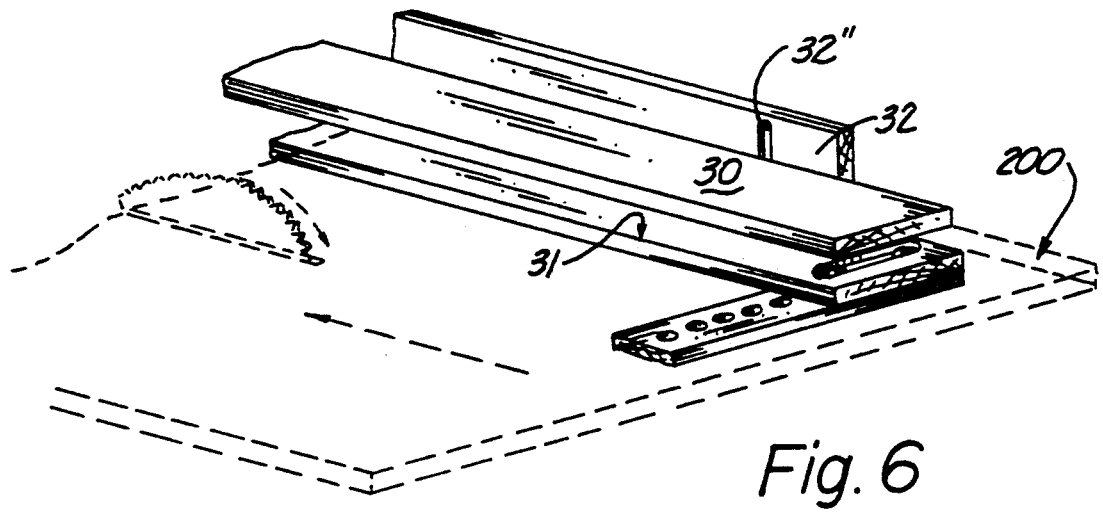
FIG. 6 is a perspective view of the completed assembly of FIG. 5.
Figure 7:
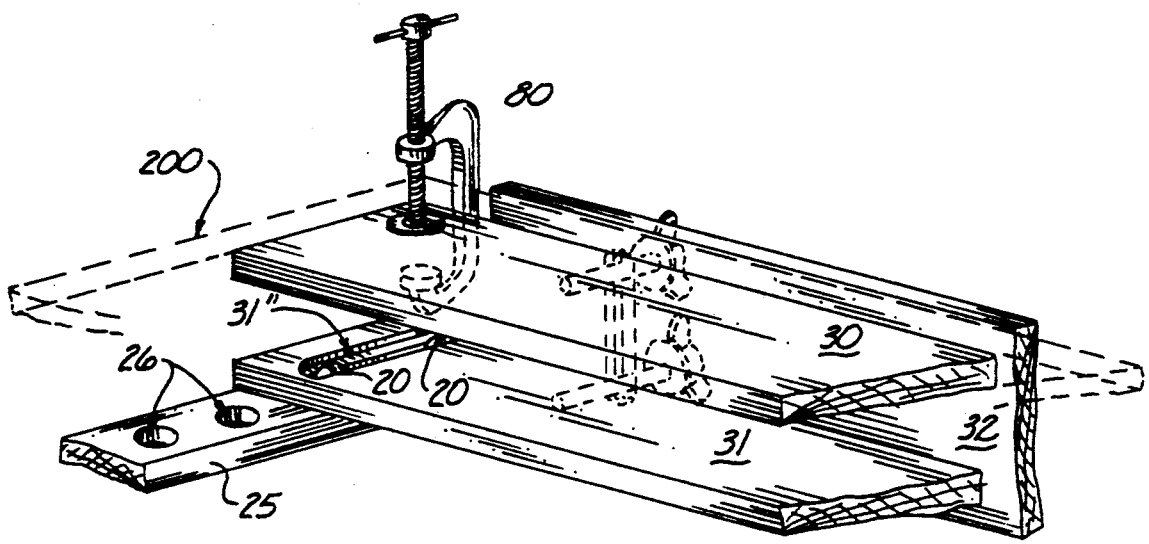
FIG. 7 is a detailed perspective view of one of the clamp units engaged with a workpiece.
Figure 8:
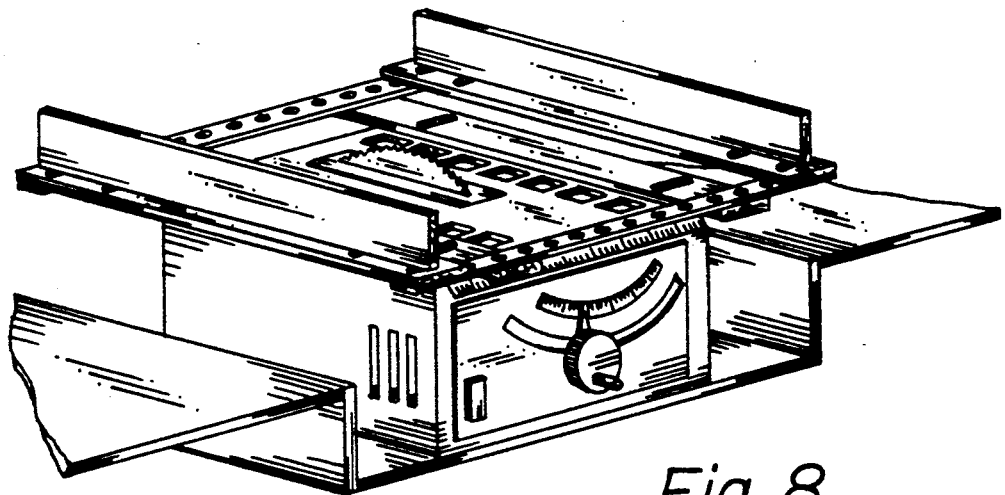
FIG. 8 is a perspective view of an alternate embodiment employing only the lower jaw member and vertical brace member of the clamp unit.
Figure 9:
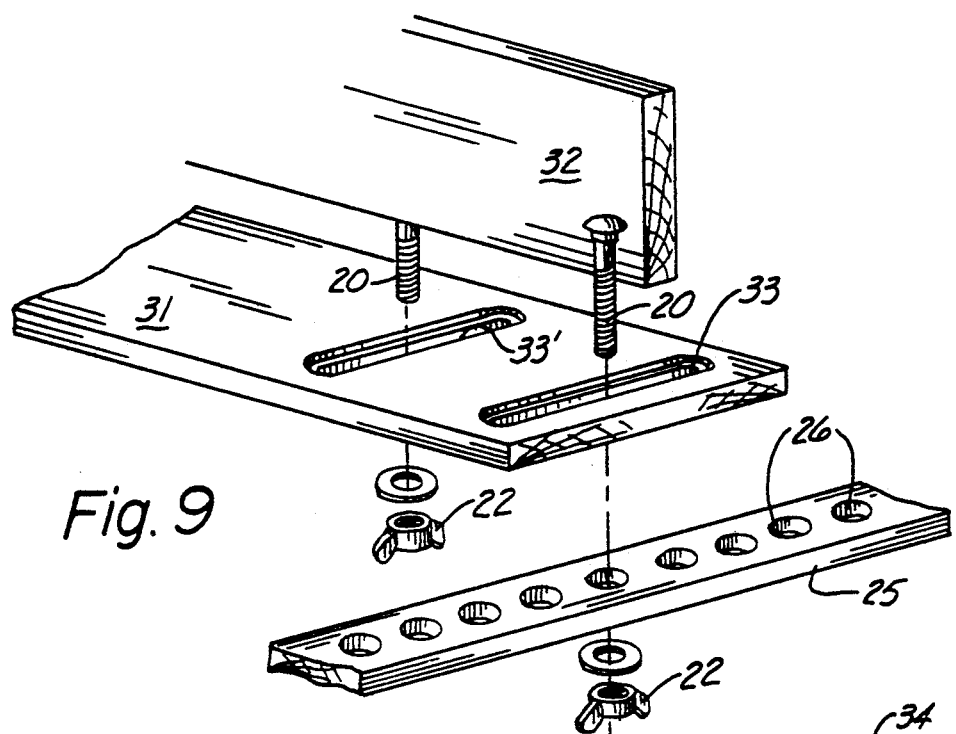
FIG. 9 is an exploded perspective view of the engagement between the lower jaw member and vertical brace member with one of the extension arm members.

Furthermore as depicted in FIGS. 6 and 7, in the event that the clamping action of the jaw members (30)(31) is insufficient to captively secure a particular workpiece (200) an auxiliary clamping mechanism (80) may be employed to reinforce the clamping pressure exerted by the jaw members (30)(31).

In the second version of the preferred embodiment depicted in FIGS. 8 through 12, each of the ends of the lower jaw member (31) are provided with spaced pairs (33)(33') and (34)(34') of slots; wherein, the outboard (33) and (34) slots are provided to accept fastening members (20) to secure the lower jaw member (31) to the extension arm members (25); and, wherein, the inboard slots (33')(34') are provided to receive fastening members (20) which depend downwardly from the brace members (32) to operatively secure the base members (32) to the lower jaw members (31).

Figure 10:
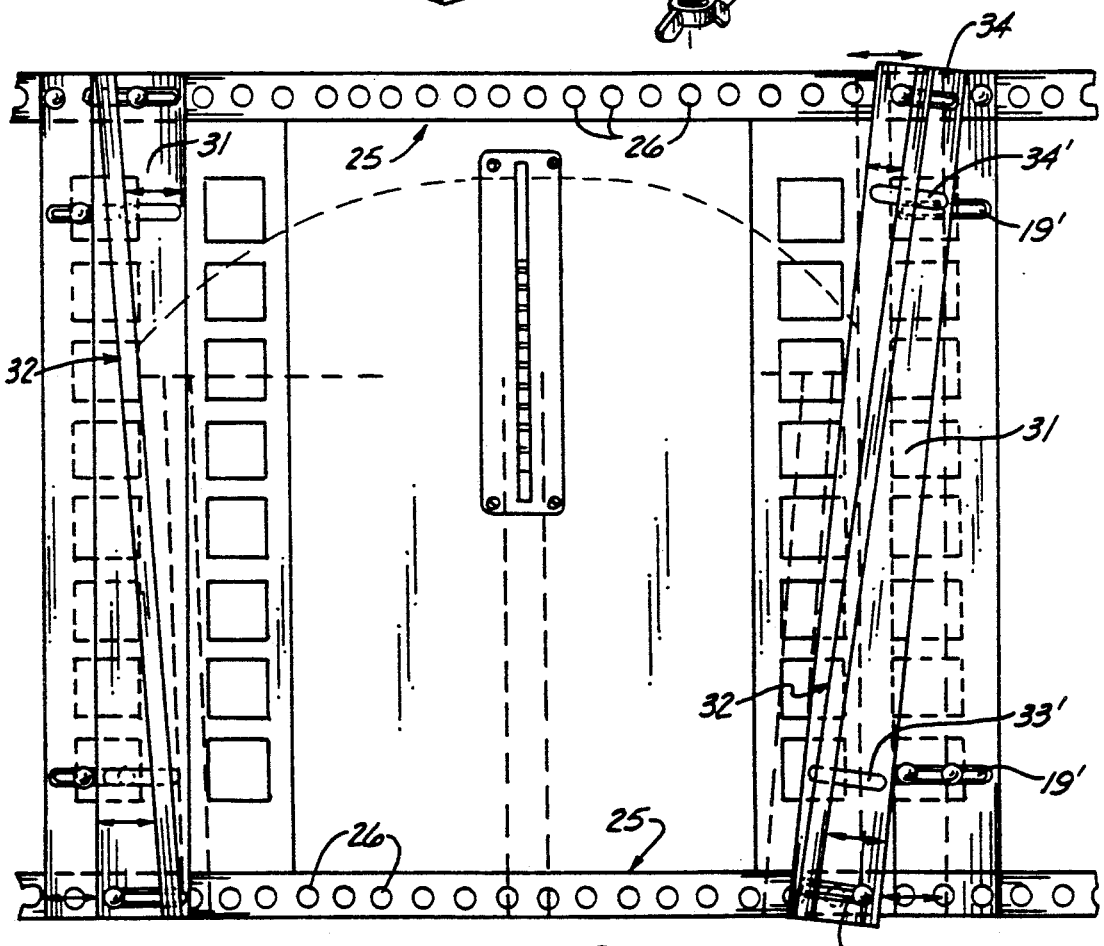
FIG. 10 is a top plan view of the alternate embodiment.
Figure 11:
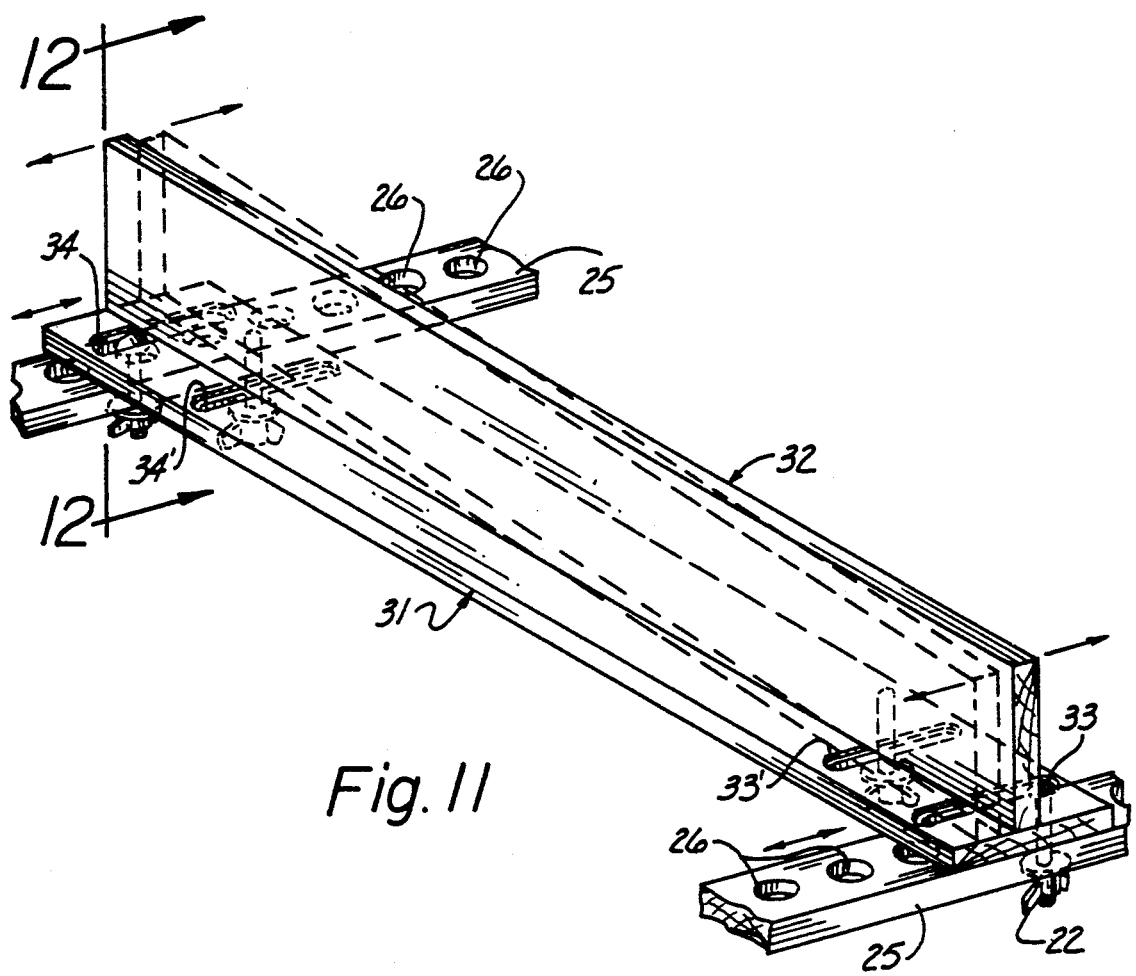
FIG. 11 is an isolated perspective view illustrating the lateral adjustability of the vertical brace member; and, FIG. 12 is a cross-sectional view taken through line 12—12 of FIG. 11.
Figure 12:
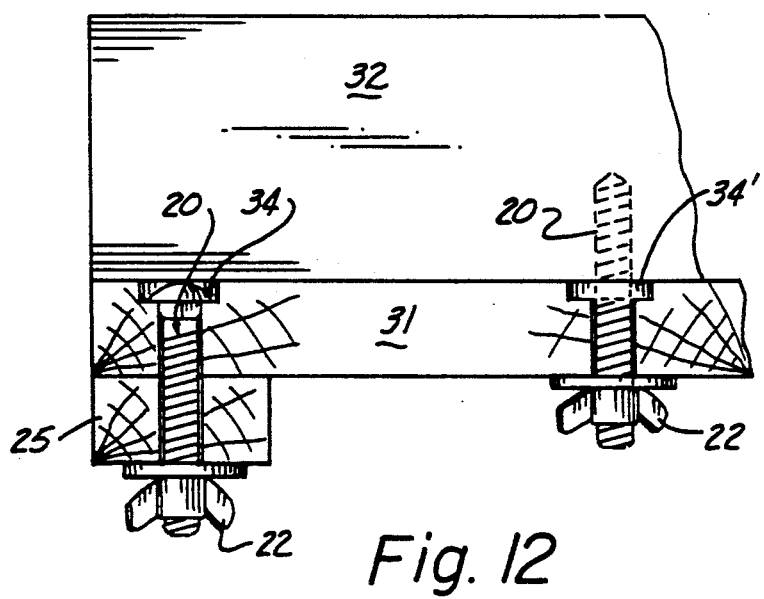

As can best be appreciated by reference to FIGS. 10 and 11, in this particular version of the preferred embodiment, not only are the lower jaw members (31) adapted to be placed at an angular orientation relative to the extension arm members (25); but, the brace members (32) are adapted to be disposed at an angular orientation relative to the lower jaw members (31).

By virtue of the wide range of adjustability afforded by the aforementioned arrangement, the brace members (32) may be quickly and easily brought into clamping engagement with the opposite sides of an odd shaped workpiece (200) such as a chair or the like depicted in phantom in FIG. 10.

Obviously the adjustable support apparatus (10) thus far described can be employed for a variety of purposes other than the cutting function provided by the table saw (100).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. An adjustable support apparatus for use with a table saw having a plurality of apertures formed on opposite ends of the table saw for supporting workpieces having different dimensions and configurations; wherein, the apparatus comprises:

a pair of mounting base units wherein each mounting base unit includes an upper and a lower mounting base member and fastening means for securing the upper and lower mounting base members on each end of the table saw at least one pair of extension arm units operatively associated with at least one of said pair of mounting base units; wherein said extension arm units include elongated extension arm members and fastening means for securing the extension arm members to said at least one of said pair of mounting base units; and, a pair of clamp units operatively associated with said pair of mounting base units; wherein each of said clamp units comprises a lower horizontal jaw member, a vertical brace member and fastening means for securing the vertical brace member to the lower jaw member.

2. The support apparatus as in claim 1; wherein each of said clamp units further comprise;

an upper horizontal jaw member provided with fastening means for moveably securing said upper jaw member to said vertical brace member.

3. The support apparatus as in claim 2; wherein said fastening means comprises a plurality of elongated threaded fastening members and threaded fasteners.

4. The support apparatus as in claim 2; further comprising;

at least one additional pair of extension arm units wherein each pair of extension arm units project outwardly from the opposite ends of said table saw.

5. The support apparatus as in claim 1; wherein the vertical brace unit is moveable secured to the lower horizontal jaw member.

* * * * *